US007875150B2

(12) United States Patent
Antal et al.

(10) Patent No.: US 7,875,150 B2
(45) Date of Patent: Jan. 25, 2011

(54) PAPERMAKING ADDITIVE

(75) Inventors: Miroslav Antal, Pointe-Claire (CA); Peter Volf, Beaconsfield (CA); Ivan I. Pikulik, Pointe-Claire (CA); Makhlouf Laleg, Pointe-Claire (CA); Jan Martin Strmen, Baie D'Urfe (CA); Jarka Matous, Beaconsfield (CA)

(73) Assignee: FPInnovations, Pointe-Claire, Quebec (CA)

( * ) Notice: Subject to any disclaimer, the term of this patent is extended or adjusted under 35 U.S.C. 154(b) by 865 days.

(21) Appl. No.: 11/628,004

(22) PCT Filed: May 19, 2005

(86) PCT No.: PCT/CA2005/000770

§ 371 (c)(1),
(2), (4) Date: Jul. 12, 2007

(87) PCT Pub. No.: WO2005/118952

PCT Pub. Date: Dec. 15, 2005

(65) Prior Publication Data

US 2008/0093040 A1 Apr. 24, 2008

Related U.S. Application Data

(60) Provisional application No. 60/575,378, filed on Jun. 1, 2004.

(51) Int. Cl.
*D21H 17/21* (2006.01)
*D21H 17/24* (2006.01)
*D21H 21/10* (2006.01)
*C08B 37/00* (2006.01)
*C08B 37/08* (2006.01)

(52) U.S. Cl. .................. 162/164.6; 162/175; 536/17.2; 536/20; 435/101; 435/171; 435/917

(58) Field of Classification Search .............. 162/164.6, 162/175; 536/17.2, 20; 435/101, 171, 917
See application file for complete search history.

(56) References Cited

U.S. PATENT DOCUMENTS

| 1,777,970 | A |  | 10/1930 | Hartman |
|---|---|---|---|---|
| 2,131,120 | A |  | 9/1938 | Schlack |
| 2,591,748 | A |  | 4/1952 | Vaughan |
| 2,623,042 | A |  | 6/1953 | Vaughan |
| 2,768,162 | A |  | 10/1956 | Evans |
| 4,282,351 | A | * | 8/1981 | Muzzarelli .................. 536/20 |
| 4,319,019 | A |  | 3/1982 | Lehmann et al. |
| 4,320,198 | A |  | 3/1982 | Mynatt |
| 4,584,357 | A |  | 4/1986 | Harding |
| 4,624,743 | A |  | 11/1986 | Gess |
| 4,806,474 | A |  | 2/1989 | Hershberger |
| 4,931,551 | A |  | 6/1990 | Albisetti et al. |
| 5,354,424 | A |  | 10/1994 | Rha et al. |
| 5,661,034 | A |  | 8/1997 | Hayakawa |
| 5,981,044 | A |  | 11/1999 | Phan et al. |
| 6,179,962 | B1 |  | 1/2001 | Brady et al. |
| 6,193,843 | B1 |  | 2/2001 | Tsai et al. |
| 6,287,423 | B1 |  | 9/2001 | Drummond et al. |
| 6,333,399 | B1 |  | 12/2001 | Teslenko et al. |
| 6,368,456 | B1 |  | 4/2002 | Cimecioglu et al. |
| 2002/0025945 | A1 | * | 2/2002 | Fan et al. ....................... 514/55 |
| 2002/0084046 | A1 |  | 7/2002 | Hsu et al. |
| 2002/0124979 | A1 | * | 9/2002 | Ovenden et al. ............ 162/158 |

FOREIGN PATENT DOCUMENTS

| DE | 550760 | 7/1929 |
|---|---|---|
| GB | 2026516 | 2/1980 |
| JP | 05-321192 | 7/1993 |
| JP | 09141000 | 3/1997 |
| WO | 90/04608 | 5/1990 |
| WO | 03/068824 | 8/2003 |
| WO | 03/086281 | 10/2003 |

OTHER PUBLICATIONS

Smook, Gary A., Handbook for Pulp and Paper Technologists, 2nd ed, Angus Wilde Publications, 1992, pp. 45 and 220.*
D. Horn et al in Paper Chemistry, Ch. $52^{nd}$ Ed. by I.C. Roberts, Blackie Academic and Professional, London 1996.
Hoffpauir et al, "Ion-Exchange Characteristics of Chemically Modified Cotton Fabrics", Sep. 1950, Textile Research Journal, pp. 617-620, Sep. 1950.
Adámek et al, Characterization of Chitosan Isolated from *Aspergillus niger* Industrial Waste Mycelium, 9th International Chitin-Chitosan Conference, Montreal, Aug. 27-30, 2003., pl.
Laleg et al, Strengthening of Mechanical Pulp Webs by Chitosan, Nordic Pulp and Paper Research Journal, No. Apr. 1992, pp. 174-180.
Ruiz-Harrera, J., "Chemical Components of the Cell Well of *Aspergillus* Species", Archives of Biochemistry and Biophysics 122, 118-125 (1967).
Stagg, C.M. et al, "The Characterization of a Chitin-Associated d-Glucan from the Cell Walls of *Aspergillus niger*", Biochimica et Biophysica Acta, 320 (1973) 64-72.

* cited by examiner

*Primary Examiner*—Matthew J. Daniels
*Assistant Examiner*—Dennis Cordray
(74) *Attorney, Agent, or Firm*—Ogilvy Renault LLP

(57) ABSTRACT

A new class of polymeric additives for papermaking is disclosed as well as a process for their manufacture, a method for their use and a paper sheet containing the addition. The additives can be used in paper manufacture as agents for improving retention, paper machine operation and the strength properties of the product. The additives are manufactured from a microbial biomass. The biomass that contains acetyl amino groups or other amides is chemically modified by hydrolysis of the amides to form primary amino groups. Under neutral or acidic conditions these primary amines become cationic, which assures a good absorption of the additive onto fibres and fines of pulp that is generally of anionic nature.

24 Claims, No Drawings

PAPERMAKING ADDITIVE

CROSS-REFERENCE TO RELATED APPLICATIONS

This application is a National entry of PCT/CA2005/000770 filed May 19, 2005, in which the United States of America was designated and elected, and which remains pending in the International phase until Dec. 1, 2006, which application in turn claims priority from U.S. Provisional application Ser.No. 60/575,378 filed Jun. 1, 2004.

This application claims priority under 35 U.S.C. 119(e) from U.S. Provisional application Ser. No. 60/575,378 filed Jun. 1, 2004.

TECHNICAL FIELD

This invention relates to a papermaking additive and a process for its production, as well as to a method of making paper with the additive and a paper containing the additive. More especially, the additive is derived from a biomass of microbiological origin.

More specifically, the additive contains polymeric carbohydrates with primary amino groups, manufactured from a by-product of microbiological production of citric acid by a fermentation process using *Aspergillus Niger*. Biomass from other microbiological process, or biomass specifically produced for this purpose could also be used. The additives may be used as retention aids, strength additives and agents for improving the operation of a paper machine. These additives are particularly useful in the production of paper from mechanical pulps or blends which contain a portion of mechanical pulp.

BACKGROUND ART

In the production of paper and board and more specifically the fibrous web is formed by draining water from an aqueous suspension of pulp and fillers in the forming section of a paper machine. In this process it is desirable to drain the water as fast as possible and to retain on the forming fabrics the largest possible proportion of pulp and filler. In the absence of retentions additives a substantial portion of pulp fibres and various fine components of the production suspension are not retained on or between forming fabrics but pass through them and leave the former with so called whitewater.

During the fabrication of paper, a flat jet of a dilute suspension of pulp and additives is injected on to the surface of a specially designed textile called a forming fabric, or into a converging gap formed by two forming fabrics. The function of the forming fabric is to allow rapid drainage of water, while retaining the largest possible fraction of solids from the suspension. The bulk of the water is rapidly drained through one or two fabrics, while a substantial portion of the suspended solids, such as fibres, fines and filler, is retained by the fabric in the form of a sheet. Ideally, all the solid material dispersed between the fabrics would be retained in the sheet; however, a portion of the solids, especially very small particles and colloidal substances, escapes through the interstices in the forming fabrics. Retention is thus always less than perfect and for a majority of paper grades made from mechanical pulps, it usually varies between about 20% and 60%. When the retention is poor, a large amount of material must be re-circulated to obtain a sheet with the desired basis weight and some of this material is eventually lost to the effluent treatment.

Only a fraction of a second is usually available for water drainage on rapidly-operating, modern paper machines and, therefore, for good machine operation it is critical that the drainage occurs rapidly. However, during rapid drainage a high shear stress occurs in the forming zone, which tends to separate the particles of fillers and fines from the fibres, and thus impair their retention.

The primary component of mechanical pulps is fibres, but the pulps also contain about 30% of small wood debris usually referred to as fines. Furthermore, mineral pigments of small particle size are often used as fillers, in amounts ranging from a few % to over 40% of sheet mass. These fillers are added to improve the printing quality of the paper, and to reduce its cost. The fines and fillers are too small to be retained on the forming fabrics by filtration. In the absence of chemical additives (commonly known as retention aids), a large proportion of these materials passes through the forming fabric and re-circulates in the white water loop. Poor retention thus causes the loss of valuable papermaking material, impairs product quality and increases the cost of both production and waste water treatment.

In a common papermaking practice, polymeric materials (usually called retention aids) are added to the papermaking furnish in order to improve the retention of fines and fillers. The retention aids are adsorbed on to the surface of fines and fillers causing the agglomeration of fine particles into flocs and, eventually, their adsorption on to the surface of pulp fibres. Polymeric additives described in the literature and available from various suppliers are used alone or with small molecular weight co-factors, sometimes also with one or two additional polymeric components, or with organic or inorganic micro particle materials.

Pulp fibres and fines, and also most fillers, are negatively charged. Many retention aids are positively charged polymers which are adsorbed on to the negatively charged fibres via electrostatic interactions. Electrostatic mechanism of retention can be efficient for chemical pulps, which are composed of relatively pure cellulose, as most of the lignin and hemicelluloses originally present in the wood are eliminated during pulping and bleaching. By contrast, mechanical pulps contain almost all of the original wood mass, including almost all the hemicelluloses and lignin. Compared with cellulose, these non-cellulose wood components usually carry a much greater negative charge. Because of the very large specific surface of mechanical pulp, a large amount of negative charge is thus available for interaction with added cationic polymers. Negative charge also resides on the dissolved and colloidally dispersed wood components which are present in the suspensions of mechanical pulps. In total, the high negative charge residing on mechanical pulps overwhelms the positive charges found on common retention aids, and greatly diminishes their efficiency.

The cationic charge of many papermaking polymers is due to the presence of quaternary amino groups, which remain cationic at all values of solution pH, or as tertiary amino groups which are cationic only in acidic solution, where the tertiary amino groups are protonated. Some water-soluble polymers have a high density of cationic charge and are designed to reduce the negative charge of papermaking furnishes. One example of such polymers is poly(diallyl-dimethylammonium chloride), known as polydadmac [D. Horn and F. Linhart, in Paper Chemistry, Ch. $52^{nd}$ Ed. by I. C. Roberts, Blackie Academic and Professional, London 1996.].

Other water-soluble polymers such as cationic starches [U.S. Pat. No. 2,768,162 (1956)] have only a low cationic charge, which improves their retention in the fibrous sheet, although the charge might not be sufficiently high to make these polymers act as good retention aids. Dry strength additives are often used to increase the strength of dry paper and board; cationic starches and water-soluble synthetic polymers such as polyacrylamides are examples. Cationic starches are the most commonly used dry strength additives. They are obtained by substituting natural starches with substituents containing tertiary or quaternary amino groups. Numerous patents exist on the preparation and application of various cationic starches. As examples there may be listed the following patents, H. Dreyfus [German patent 550,760 (1929)], M. Hartman [U.S. Pat. No. 1,777,970 (1930)] C. P. L. Vaughan [U.S. Pat. Nos. 2,591,748 (1952) and 2,623,042 (1952)], P. Schlack [U.S. Pat. No. 2,131,120 (1938)], C. L. Hoffpauir and J. D. Guthrie [Textile Res. J., Vol 20, page 617 (1950),] and E. F. Evans [U.S. Pat. No. 2,768,162 (1956)]. Conversion of neutral starch to cationic starch increases the cost of this product, and also reduces its molecular weight causing a loss of yield and reduction of some desirable properties. In contrast to polymers containing primary amino groups such as polyethyleneamine and chitosan, the conventional cationic starches containing tertiary or quaternary amino groups cannot form imino groups with aldehydes.

Wet strength additives are well known, and have been extensively described in the literature. Two types of chemical agents are used to improve the wet strength of paper, namely those that impart permanent wet strength and those that provide temporary wet strength. The common "permanent" wet strength agents (often thermosetting resins) are cationic epichlorohydrin-based polymers. Papers made with these resins retain a substantial portion of their dry strength even when soaked in water for a long time. The cationic epichlorohydrin-based resins, such as polyamide-epichlorohydrin resin, polyamine-epichlorohydrin resin and polyamide-epichlorohydrin epoxide resin represent about 94% of the total wet-strength chemicals market. The most effective pH range for these resins is 6.5-8.5. Papers made with high dosage levels of cationic polyamide-epichlorohydrin (PAE) resin, such as Kymene 557H (trademark) (from Hercules) and Amers 8855 (trademark) (from Georgia Pacific), can have improved dry strength and permanent wet strength. The permanency of wet strength developed with PAE resin results from the formation of water-resistant chemical bonds within the paper structure. When paper containing such resin is heat dried, the reactive group of the resin, hydroxyazetidinium, bonds with the amino group of the resin itself, as well as with the carboxyl groups on the fibres. One major problem associated with use of high dosage levels of permanent wet strength resins is that the broke can be difficult to repulp.

It is widely accepted that the temporary wet strength agents introduce into the fibre network covalent bonds which slowly react in water and eventually are disrupted. The chemical agents that can be used to impart temporary wet strength may include glyoxal monomer (CHOCHO), glyoxalated synthetic polymers such as polyacrylamide (Parez 631 NC and Parez 75A—trademark from Bayer), aldehyde starches such as cationic dialdehyde starch (CoBond 1000 —trademark from Hercules) produced by oxidation of the glucose units of starch, and cationic aldehyde starch DAS (made by substitution of hydroxyl groups on the glucose units of starch), and polymers containing primary amino groups such as polyethylenimine, polyvinylamine and chitosan. The aldehyde groups form hemiacetal bonds with the hydroxyl groups of cellulose, whereas the primary amino groups may react with aldehyde groups and carboxyl groups of cellulose to form imino bonds and ionic interactions.

Wet-web strength additives are the products that are capable of increasing the strength of a freshly-formed, never-dried wet web as it proceeds from the wet end of a paper machine towards the dryer section. These products are new in the industry and are not widely used. Wet-web strength additives have been described in the literature, namely chitosan, polyethylenimine, cationic aldehyde starch and glyoxylated polyacrylamide.

Starches substituted with primary amino groups have been prepared using complicated procedures, which, if applied on a commercial scale, would make the products too expensive and therefore unsuitable for application as papermaking additives. Examples of such synthetic routes are described by F. Pancirolli and A. A. Houghton [UK patent 493,513 (1938)]. An alternative route for the production of starch additives containing primary amino groups was published recently [M. Antal, et. al., U.S. Pat. No. 6,455,661, (2002)]. At this time this invention did not yet find a commercial application.

Polyethyleneimine is a commercially-used, water-soluble, cationic, papermaking additive, which contains a certain proportion of its amino groups in their primary form. It has been reported that chitosan is an efficient retention additive and strengthening agent for mechanical pulps. These results were described, for example, in [M. Laleg and I. I. Pikulik, Nordic Pulp and Paper Res. J., Vol. 7, No. 4 page 174 (1992)].

Chitin is a natural polysaccharide with a structure similar to that of cellulose, but differs from cellulose in that one hydroxyl group in every glucose unit of chitosan is replaced by an acetylamino group. Chitosan is produced from chitin by deacetylation of amide groups. This reaction is usually carried out with a large excess of concentrated sodium or potassium hydroxide at high temperature. The chemical structure of chitosan resembles that of cellulose, but differs from cellulose in that one hydroxyl group in every glucose unit of chitosan is replaced by an amino group.

In acidic solutions, amino groups of chitosan become positively charged, making chitosan solutions strongly cationic. Therefore when added to the papermaking furnish, chitosan quickly absorbs on negatively charged fibres and fines. It is believed that the primary amino groups of chitosan can react with the carbonyl groups that are found in large amounts especially in the lignin components of mechanical pulps. The product of such reaction is a strong, chemical imino bond between the fibre or fine and the additive. Since each polymeric molecule of the additive can form similar bonds with two or several fibres, the entire fibrous network can be cross linked and reinforced by a polymer that contains primary amino groups. This cross linking can occur during the consolidation of wet web and thus polymers containing primary amino groups can increase the strength of never-dried wet webs. The strength of wet webs is critical for good operation of paper machines especially at high speed.

The shells of sea crustaceans are the most common source of chitin for chitosan production. The procedure for preparation of chitosan from this source is complex, requiring a large amount of chemicals, and the yield is only about 20% based on dry shells. Therefore, the cost of chitin produced from shellfish is high and chitosan is relatively expensive. Because of its high cost the application of chitosan in papermaking has only been sporadic and has not found acceptance in any paper mill at the present time. The world supply of sea shells suitable for industrial production is limited, and chitosan from this source could not satisfy a large scale demand from the paper industry. Thus, a new class of retention aids, which would have the chemical nature and mechanism of action of chitosan, but which could be produced in large quantities at low cost would be highly desirable.

Several procedures have been described for production of chitosan from microbiological materials. Some microorganisms, for example such moulds as *Aspergilus Niger, Mucor mucedo*, or *Penicillium*, contain chitin as a part of their cell wall, but generally these chitins are chemically attached to carbohydrate polymers. The published or patented procedures for the extraction of chitosan or chitosan-containing materials are aimed at product used in medicine, cosmetics, food industry, for extraction of heavy metals or for other high-value products. Therefore production procedures that use several reaction steps, large amount of chemicals or reactions in pressurized vessels are acceptable. The products are usually pure forms of chitosan in which the deacetylation equals or exceeds 85% and from which most of the carbohydrates have been removed. For example, DE 29 23 802 A1 disclosed the treatment of the mould *Mucor rouxii* with 40% sodium hydroxide at 128° C. To prevent boiling, such a reaction needs to be carried out in a pressurized reaction. The product was capable of binding heavy metals. According to WO 2003086281, chitosan can be prepared by reacting dry *Aspergillus Niger* mycelium with a solution of sodium hydroxide at 110° C. Also, WO 2001068714 (US 2002025945) describes a method for producing at least 85% deacetylated chitosan by reacting the chitin-containing biomass with 25% alkali at 95° C. for at least 10 hours. The pure chitosan is then separated from the alkaline solutions and washed. This procedure is preferably preceded by a pre-treatment of biomass with alkaline solution. The product could be used for cosmetic, medical and dietary application.

U.S. Pat. No. 3,632,575 describes the production of chitin-containing material for healing of wounds. The production involves the extraction of biomass with chloroform, an 18 h reaction with a solution of sodium hydroxide, acidification with hydrochloric acid and purification by dialysis. U.S. Pat. No. 6,333,399 describes production of chitosan-glucan complexes for application in medicine, food industry or in environmental protection. The production of these materials involves treatment of *Aspergilus Niger* in at least four reaction steps:

1. Treatment with alkaline solution to remove proteins and glucan complexes; this procedure is preferably repeated two to four times, followed by filtration of solids;
2. Acidification with a mineral acid to remove mineral materials;
3. A second treatment with alkaline solution at temperatures between 90 and 150° C. to hydrolyze chitin to chitosan;
4. Treatment with low concentration mineral acid.

This procedure requires large amounts of reagents, a pressurized reaction vessel and a relatively large amount of time, which inevitably increases the cost of final product. Such a procedure might be convenient for a product used for medical purposes or extraction of heavy or radioactive metals but would be too expensive for a papermaking additive.

The common feature of the described methods for the production of chitosan from microbiological sources is the complex and expensive production method of preparation which is suitable for the products that are used in cosmetics, medicine or the food industry. The chitosan is isolated from the reaction mixture and is used in a relatively pure form.

DISCLOSURE OF THE INVENTION

This invention seeks to provide a novel type of papermaking additive.

In particular, this invention seeks to provide such an additive from a biomass of microbiological origin.

This invention further seeks to provide a process for producing a papermaking additive of the invention.

This invention also seeks to provide a method of making paper.

The invention also seeks to provide a new paper.

Still further, the invention seeks to provide a method of enhancing retention of components of a papermaking stock in a paper sheet formed from such stock and of increasing the strength of finished product.

The invention also seeks to provide use of an additive to enhance retention of components of a papermaking stock in a paper sheet formed from the stock and to increase the strength of finished paper.

The invention further seeks to provide a papermaking stock containing the additive of the invention.

In one aspect of the invention, there is provided a papermaking additive comprising an at least partially deacylated biomass of a polymer or oligomer having carbohydrate and glucosamide units.

In another aspect of the invention there is provided a papermaking additive comprising at least one polymer consisting of a carbohydrate polymeric or oligomeric chain bound to at least one glucoasamine unit, and which contains at least one primary amino group.

In yet another aspect of the invention, there is provided a process of producing a papermaking additive comprising deacylating at least part of the glucosamide component of a polymer having carbohydrate and glucosamide components.

In still another aspect of the invention, there is provided in a method of making paper from a pulp fibre papermaking furnish having an additive system to promote retention of fines and fillers with the pulp fibres, the improvement wherein the additive system compares an additive of the invention.

In yet another aspect of the invention, there is provided a paper comprising pulp fibres and a retention aid, said retention aid comprising an additive of the invention.

In still another aspect of this invention, there is provided a method of enhancing retention of components of a papermaking stock in a paper sheet formed from said stock in papermaking, said stock comprising an aqueous dispersion of papermaking fibers and a papermaking additive in an aqueous vehicle, wherein said additive is the additive of the invention.

In yet another aspect of this invention, there is provided a method of increasing the strength properties of paper made from said papermaking stock, said stock comprising an aqueous dispersion of papermaking fibers and a papermaking additive in an aqueous vehicle, wherein said additive is the additive of the invention.

The invention also relates to a method of producing paper comprising:

forming a sheet from a papermaking stock comprising an aqueous paper-forming dispersion of papermaking components comprising papermaking fibers and a papermaking additive in an aqueous vehicle, wherein said additive is an additive of the invention.

Still further, the invention relates to use of an additive of the invention to enhance retention of components of a papermaking stock in a paper sheet formed from the stock; and/or increase the strength properties of such paper sheet formed from the stock.

In a specific embodiment, the product according to the present invention is the crude material prepared by a partial deacetylation of amide groups found in the biomass of *Apergilus Neger* or other microbiological by-product. The product does not need to be pure and does not have to be 100% deacetylated. However a high degree of deacetylation is desirable as the cationic charge of the additive increases with the increasing degree of deacetylation. All the reaction by-product might be still present, and indeed it is desirable to retain the polycarbohydrates in the product as they can act as bonding agents and strength additives in paper. Thus the product according to this invention is a chemically modified biomass, which might contain many or all of the reaction by-products. While the purity and degree of deacetylation might be important for some applications of glucosamins, product price is an important feature of papermaking additives as the total cost of an additive should not be higher than several dollars per ton of paper or paperboard.

In this regard, the product of the invention is distinct from the chitosan products employed in the prior art in different fields, as described above.

DETAILED DESCRIPTION OF THE PREFERRED EMBODIMENTS OF THE INVENTION

A novel type of papermaking additive has been developed that consists of an uncharged carbohydrate polymeric or oligomeric chain to which is chemically bound, glucosamine unit or units, in which each glucosamine unit contains a primary amino group. The new additive is thus a polymer and may be obtained from the biomass of Aspergillum Niger which is a waste material in the production of citric acid from glucose. An essential step in the preparation of the new additive involves the deacylation of at least some of the amide groups to form primary amino groups.

Preparation of the Novel Papermaking Additive

The novel type of natural papermaking additive overcomes some disadvantages of conventional additives such as those described above. The new additive is a polymer which consists of an uncharged carbohydrate polymeric or oligomeric chain that has chemically bound glucosamine unit or units, in which each glucosamine group contains a primary amino group. Suitably, the polymer consists of a carbohydrate polymeric or oligomeric chain bound to at least four glucosamine units, and which contain at least four primary amino groups. In such case, each glucosamine unit contains at least one primary amino group. The new polymer may be obtained from a biomass of Aspergillum Niger which biomass is a waste material in the production of citric acid from glucose. In the original biomass the glucosamine exists in the form of an amide of acetic acid. An essential step in the preparation of the new additive involves the deacylation of at least some of the amide groups to form primary amino groups.

In slightly acidic water, such as the process water of papermaking, the polymer becomes cationic and is therefore absorbed and retained on anionic pulp. Under these conditions the primary amino groups can also form imino bonds with carbonyl groups, which renders this additive especially convenient for applications with mechanical pulps. Since the uncharged carbohydrate molecule is chemically bound to the glucosamine groups or glucosamine chains, this portion of the additive will also be retained in the sheet, without requiring any chemical modification.

The new product has some similarity with chitosan described above in that it also contains glucosamine polymer. The product differs however from the chitosan in that the glucosamine portion and any non-deacylated glucosamide portions represent only between 6 and 25%, by weight, of the total mass. The rest of the product (75 to 94%, by weight) consists of the carbohydrate polymers or oligomers containing no amino or amido groups. This carbohydrate component is however retained in the sheet as it is attached to the charged glucosamine moiety and in moist paper can act as a strength agent.

In the previously published methods for the production of chitosan from biomass the carbohydrate moiety is usually removed by hydrolysis as the carbohydrate portion of the biomass product is considered an impurity. This severely reduces the yields and increases the production cost. It has now been recognized that the carbohydrate portion of the biomass can actually improve the papermaking properties of additive derived from this source. In particular the carbohydrate polymer, chemically bound to the glucosamine, is absorbed onto the pulp fibres and thus retained in the sheet where it acts as a strength additive. While it might be surprising to those skilled in the arts of papermaking chemistry, it has now been discovered that it is not necessary to eliminate the neutral carbohydrate chains from the biomass, in order to produce a useful papermaking additive.

The production of the novel polymer additive comprises the deacylation of at least some of the amide groups, which may be achieved using a strong base such as sodium or potassium hydroxide. The biomass of Aspergillum Niger dissolves in strongly alkaline solutions and therefore this reaction can be carried out in a homogeneous medium. The hydrolysis of biomass in a homogeneous liquid phase occurs more readily than the heterogeneous hydrolysis of seashell chitin. The reaction requires a smaller excess of hydroxide and a lower temperature that does not require a pressurised reactor. Since virtually all material is left in the product the yield of the reaction is high. Therefore the production cost of this microbiological product is much lower than that associated with the production of seashell chitosan. The product is obtained in the liquid form and is ready for direct application in papermaking.

Persons in the art can readily determine appropriate or optimum amounts of the additive for particular papers; in general the additive is employed in the papermaking stock in an amount of 0.05 to 5.00%, by weight, preferably 0.1 to 2.0%, by weight, based on the oven dry weight of the fibers.

The large amount of sodium hydroxide required for the complete hydrolysis of mycelium increases the production costs. It has been found that even partially hydrolyzed mycelium obtained when a smaller proportion of hydroxide is used, is suitable as a papermaking additive. The optimal level of hydrolysis can be determined as a compromise between the cost of production and benefits in papermaking.

Thus, in one particular embodiment, the glucosamide units are fully deacylated (i.e. 100% deacylation) so that the polymer contains glucosamine units and carbohydrate units and is free of glucosamide units. In this case, the polymer consists of the glucosamine units and the carboyhydrate units.

In another particular embodiment, only partial deacylation is carried out so that the polymer contains glucosamine units, glucosamide units and carbohydrate units. In this embodiment, deacylation may range typically from 35 to 80%, preferably 50 to 80%.

The papermaking stock of the invention contains the papermaking fibers, optional filler, and the additive of the invention, in an aqueous vehicle in which the fibers and optional filler are dispersed, the additive being dissolved in the aqueous vehicle.

Increasing the Molecular Weight of the Novel Additive by Epichlorohydrin

The papermaking additive prepared according to this invention has a lower molecular weight than some synthetic polymers or chitosan derived from the shells of sea crustaceans. The lower molecular polymers form less viscous solutions which facilitate handling, but tend to be less effective as retention aids. It has now been discovered that the molecular weight of papermaking additive prepared from the residual biomass according to this invention can be increased by crosslinking this product with epichlorohydrin (EC). Each molecule of epichlorohydrin can react with two primary amino groups as shown into the following equation:

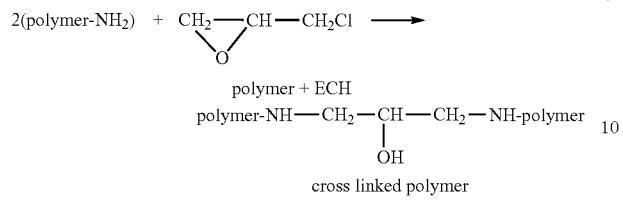

polymer + ECH polymer-NH—CH$_2$—CH—CH$_2$—NH-polymer
                    |
                    OH cross linked polymer If each of these reactive amino groups belongs to a different macromolecule then this reaction joins together two polymeric molecules and thus more than doubles their molecular mass. The number of cross links between polymeric molecules increases with increasing addition of ECH. In this reaction the primary amino groups are converted to secondary amino groups as shown above. Since in acidic solutions both the primary amino groups and the secondary amino groups can be protonated and converted to ammonium compounds, the charge density of the product is not diminished by this cross-linking.

The extent of cross-linking must be carefully controlled by adjusting the ratio of additive and ECH. Too small a proportion of ECH will not yield a sufficient increase in the average molecular mass. An excessive amount of ECH leads to extensive cross-linking and to a product with a very large molecular mass. Such a product may not be water soluble and therefore would be unsuitable as papermaking additive. This increase in the molecular weight by reaction with ECH is not specific to the product according to this invention but could be used with any natural or synthetic polyamine containing primary or secondary amino groups, such as chitosan or polyvinylamine.

EXAMPLES

The production and application of papermaking additives according to this invention are demonstrated in the following examples. Example 1 demonstrates the hydrolysis of the mycelium under conditions in which almost all amino groups are expected to be converted to primary amino groups. Example 2 demonstrates the improvement in strength of paper made from mechanical pulp by the polymer prepared according to the Example 1. Example 3 describes the less expensive and less complete hydrolysis of mycelium using less concentrated sodium hydroxide. While the hydrolysis might not be complete, the product has a sufficient proportion of primary amino groups to be suitable for application as a papermaking additive as demonstrated in Example 4. The strengthening effect of additive according to Example 1 on sheets made of bleached thermo mechanical pulp is demonstrated in Example 5.

Example 1

Preparation of the Additive

Mycelium used as the starting material was a by-product from the production of citric acid which was dewatered to a solids content of 16.6% by pressing. 500 g of mycelium was placed in a reactor and 1270 g of 50% solution of sodium hydroxide was added. The blend was mildly agitated, heated to between 80 and 90° C. and maintained at this temperature for 2 hours. The entire mycelium dissolved forming a viscous solution. The solution was allowed to cool down and was diluted with 2500 g water. The strongly alkaline solution was then neutralized by adding 3820 g of 15% hydrochloric acid. The product had a weight of about 8100 g, pH between 8 and 9, and contained about 1% of organic solids. This product was tested as papermaking additive with no further modification.

Example 2

Application of Novel Additive with
Peroxide-Bleached Thermo Mechanical Pulp
(BCTMP)

The additive prepared according to the Example 1 was added to an agitated 3% suspension of BCTMP in an amount that corresponded to 0.5% of organic solids calculated on dry pulp. Immediately after blending of the additive, handsheets were produced using the standard PAPTAC procedure. Handsheets were also produced from BCTMP with no additives and the properties of sets of handsheets were compared. Handsheets made with the novel additive had 9.8% greater breaking length (3.14 km as compared to 2.86 km), 21% greater Tensile Energy Absorption (TEA) index (490.7 mJ/g compared to 404.77 mJ/g) and 26.6% greater Scott Bond strength (290 J/m$^2$ as compared to 229 J/m$^2$). At the addition rate of 0.25% with respect to the organic solids, the Scott Bond strength was improved by 19.6% to 274 µm$^2$.

Example 3

More Economical Method of Preparation of the
Additive that Requires a Smaller Amount of Sodium
Hydroxide 500 g of mycelium from the same source as in Example 1 was placed in a reactor and 1270 g of a 10% solution of sodium hydroxide was added. The blend was mildly agitated, heated to between 80 and 90° C. and maintained at this temperature for 2 hours. The entire mycelium dissolved forming a viscous solution. The solution was allowed to cool down and diluted with 3010 g water. The strongly alkaline solution was then neutralized to a pH between 8 and 9. This product was tested as papermaking additive with no further modification.

Example 4

Application of Partially Hydrolyzed Mycelium with
BCTMP

The additive prepared according to the Example 3 was added to an agitated 3% suspension of BCTMP in an amount that corresponded to 0.5% of organic solids calculated on dry pulp. Immediately after blending of the additive, handslieets were produced using the standard PAPTAC procedure. Handsheets were also produced from BCTMP with no additives and the properties of sets of handsheets were compared. Handsheet made with the novel additive had 11.4% greater TEA index (450.7 mJ/g compared to 404.77 mJ/g) and 12.4% greater Scott Bond strength (257.5 J/m$^2$ as compared to 229 J/m).

Example 5

Application of Novel Additive with a Pulp Blend Containing BCTMP

An agitated pulp suspension containing 12% of bleached softwood kraft and 88% of BCTMP was treated with the additive prepared according to the procedure outlined in Example 1. The addition rate was 7.5% with respect to the original mycelium. The handsheets produced from the treated pulp had the following improvements in mechanical properties, compared with untreated pulp: Breaking length was increased 12.4% (from 4.59 km to 5.16 km), TEA index was increased 26.6% (from 903.9 mJ/g to 1143.9 mJ/g) and the Scott Bond strength was increased 72.5% (from 193 $J/m^2$ to 333 $J/m^2$).

Example 6

Application of Novel Additive with BCTMP of High Freeness

BCTMP of high freeness forms a very weak wet web and dry sheet. It is difficult to increase the strength of sheet made from this pulp as its strong anionic charge tends to deactivate cationic additives. This test was similar to that described in Example 2 except that a larger amount of additive prepared as in Example 1, namely 7.5% with respect to the original mycelium, was used. Under these conditions, substantial improvements were obtained in the strength of never-dried wet web. Thus the additive increased the breaking length of sheet at the solids content of 59% from 3 m to 75 m and at the solids content of 64% from 43 m to 144 m. The stronger wet webs would be expected to improve the runnability of paper machines. The mechanical properties of dry paper also improved as shown it Table 1.

Example 7

Application of Novel Additive with a Blend of Bleached Kraft Pulps

A pulp suspension was prepared from 80% hardwood kraft and 20% softwood kraft. Both pulps were obtained from Eastern Canadian pulp mills. The pulp suspension was treated with 1% of additive prepared according to Example 1 and the handsheets prepared from this pulp were compared with those made from untreated pulp. The proportion of additive is expressed as the amount of original dry mycelium with respect to dry pulp. The additive increased the Scott Bond strength of paper by 58%, namely from 105 $J/m^2$ to 166 $J/m^2$.

TABLE 1

Properties of paper made from BCTMP of high freeness with and without additive according to Example 1

| Additive | BW, g/m2 | B.L., km | Stretch, % | TEA index, mJ/g | Scott bond, J/m2 | Porosity, s/100 mL |
|---|---|---|---|---|---|---|
| None | 54.2 | 0.647 | 0.478 | 17 | 34 | 0.4 |
| Ex. 1 | 59.8 | 1.479 | 0.982 | 86 | 63 | 0.4 |

BW = Basis Weight - the weight of a unit area of product, usually reported in $g/m^2$, or $lb/ft^2$.
BL = Breaking Length
TEA = Tensile Energy Absorption

Example 8

Application of Partially Hydrolyzed Mycelium with a Blend of Bleached Kraft Pulps The pulp blend and the treatment method were similar to those described in Example 7. The only difference was that the additive used in this work was prepared as described in Example 3. Under these conditions the additive increased the Scott Bond strength of paper by 26.7%, namely from 105 $J/m^2$ to 133 $J/m^2$.

Example 9

Increasing the Molecular Weight of the Additive by Cross-Linking

The additive according the Example 1 at a concentration of 3.6%, was blended at room temperature and a pH of 11.5 with epichlorohydrin added in amount of 5% with respect to dry product. Immediately after the addition of ECH a significant increase in the viscosity was observed indicating an increase in the molecular mass of the product. The viscosity continued to increase with the reaction time and the amount of ECH as shown in Table 2:

TABLE 2

Increasing the molecular mass of products according to Examples by reacting it with epichlorohydrin

| Sample: % ECH/reaction time (h) | Viscosity of a 1% solution (mN/m) | Viscosity of a 0.1% solution (mN/m) |
|---|---|---|
| 2.5/2 | 5.2 | 1.6 |
| 2.5/24 | 7.7 | 1.8 |
| 5/4 | 10 | 2.0 |
| 5/24 | 25 | 3.5 |
| 7.5/24 | $2 \times 10^{24}$ | 86 |

Example 10

The Application of Cross Linked Additive with Thermo Mechanical Pulp

The papermaking suspension used for testing the retention contained 80% of unbleached TMP and 20% of hydro fine clay. The concentration of the suspension, which had a pH of 5.5, was adjusted to 0.52% and the temperature to 50° C. The retention of this suspension was tested in a Britt Dynamic Drainage Jar equipped with a screen having a mesh of 80. The rotor speed was 750 rpm. The total retention and clay retention were measured in the absence of retention aid using two retention aids. The first retention system was prepared according to Example 1 and the second was the same product but cross linked as described in the Example 9. The results are summarized Table 3 below. The addition of microbiological polymer according to Example 1 increased the total dynamic drainage jar (DDJ) retention from 61% to 74% or 82%. The retention was increased even more when this polymer was cross-linked as described in Example 9, namely to 77% or to 89% and there was also some improvement in the clay retention.

TABLE 3

Result of the retention test with products according to Examples 1 and 9

| Retention aid | Amount (kg/ton) | Total retention (%) | Clay retention (%) |
|---|---|---|---|
| No additive | 0.0 | 61 | 2 |
| Example 1 | 0.4 | 74 | 23 |
| Example 1 | 0.8 | 82 | 36 |
| Example 2 | 0.4 | 77 | 23 |
| Example 2 | 0.8 | 89 | 42 |

In this specification, % are by weight except when % are employed in the Examples to identify improvements in parameters such as Scott Bond.

The invention claimed is:

1. A retention and strengthening papermaking additive comprising a partially deacylated microbial biomass of a polymer or oligomer having carbohydrate units chemically bound to glucosamide units, and the dissolved mycelium of the microbial biomass in an aqueous vehicle, said partially deacylated biomass containing 6 to 25%, by weight, of the biomass, of non-deacylated glucosamide units and glucosamine units derived from deacylation of glucosamide units of said polymer or oligomer, and 94 to 75% by weight of the biomass, of said carbohydrate units and said carbohydrate units being chemically bound to said glucosamine units and any non-deacylated glucosamide units, the partial deacylation of the biomass being from 35 to 80% deacylation.

2. A retention and strengthening papermaking additive according to claim 1, wherein said biomass is derived from Aspergillum Niger employed in production of citric acid from glucose.

3. A retention and strengthening papermaking additive according to claim 1, which comprises at least one polymer consisting of a carbohydrate polymeric or oligomeric chain bound to at least four glucosamine units, and which contains at least four primary amino groups.

4. A retention and strengthening papermaking additive, comprising a partially deacylated microbial biomass of a polymer or oligomer carbohydrate units chemically bound to glucosamide units;

said partially deacylated biomass containing 6 to 25%, by weight, of the biomass, of non-deacylated glucosamide units and glucosamine units derived from deacylation of glucosamide units of said polymer or oligomer, and 94 to 75% by weight of the biomass, of said carbohydrate units and said carbohydrate units being chemically bound to said glucosamine units and any non-deacylated glucosamide units, the partial deacylation of the biomass being from 35 to 80% deacylation;

wherein amino groups of at least one polymer of said biomass are cross-linked with epichlorohydrin.

5. A retention and strengthening papermaking additive according to claim 1, wherein said deacylation is 50 to 80% deacylation.

6. A process of producing a retention and strengthening papermaking additive comprising deacylating part of the glucosamide units of a microbial mass of a polymer or oligomer having both carbohydrate units and glucosamide units to form glucosamine units from glucosamide units, such that carbohydrate units remain chemically bound to said glucosamine units and non-deacylated glucosamide units, with dissolution of the mycelium of the microbial mass in an aqueous vehicle of the additive, the partial deacylation of the biomass being from 35 to 80% deacylation, and wherein said glucosamine units and non-deacylated units comprise 6 to 25% by weight of the biomass and the carbohydrate units comprise 94 to 75% by weight, of the biomass.

7. A process according to claim 6, wherein said deacylating is carried out with an alkali to generate said glucosamine units, while retaining said carbohydrate units in the polymer.

8. A process according to claim 6, further comprising cross-linking amino groups of at least one polymer of said biomass with epichlorohydrin.

9. In a method of making paper from a pulp fibre papermaking furnish by adding to the furnish an additive system to promote retention of fines and fillers with the pulp fibres and to increase the strength of finished paper or paperboard, the improvement wherein the additive system comprises a retention and strengthening papermaking additive comprising a partially deacylated microbial biomass of a polymer or oligomer having carbohydrate units chemically bound to glucosamide units, and the dissolved mycelium of the microbial biomass, in an aqueous vehicle, said partially deacylated biomass containing 6 to 25%, by weight, of the biomass, of non-deacylated glucosamide units and glucosamine units derived from deacylation of glucosamide units of said polymer or oligomer, and 94 to 75% by weight of the biomass, of said carbohydrate units and said carbohydrate units being chemically bound to said glucosamine units and any non-deacylated glucosamide units, the partial deacylation of the biomass being from 35 to 80% deacylation.

10. A method according to claim 9, wherein the furnish comprises mechanical pulp fibres.

11. A method according to claim 9, wherein amino groups of at least one polymer of said biomass are cross-linked with epichlorohydrin.

12. A paper comprising pulp fibres and a retention and strengthening papermaking additive consisting essentially of a partially deacylated microbial biomass of a polymer or oligomer having carbohydrate units chemically bound to glucosamide units, said partially deacylated biomass containing 6 to 25%, by weight, of the biomass, of non-deacylated glucosamide units and glucosamine units derived from deacylation of glucosamide units of said polymer or oligomer with dissolution of the mycelium of the biomass, and 94 to 75% by weight of the biomass, of said carbohydrate units and said carbohydrate units being chemically bound to said glucosamine units and any non-deacylated glucosamide units, the partial deacylation of the biomass being from 35 to 80% deacylation.

13. A paper according to claim 12, wherein said pulp fibres comprise mechanical pulp fibres.

14. A paper according to claim 12, further comprising filler.

15. A paper according to claim 12, wherein amino groups of at least one polymer of said biomass are cross-linked with epichlorohydrin.

16. A papermaking stock comprising:

an aqueous dispersion of papermaking components comprising papermaking fibers and a papermaking additive in an aqueous vehicle, wherein said additive is a retention and strengthening papermaking additive comprising a partially deacylated microbial biomass of a polymer or oligomer having carbohydrate units chemically bound to glucosamide units, and the dissolved mycelium of the microbial biomass, said partially deacylated biomass containing 6 to 25%, by weight, of the biomass, of non-deacylated glucosamide units and glucosamine units derived from deacylation of glucosamide units of said polymer or oligomer, and 94 to 75% by weight of the biomass, of said carbohydrate units and said carbohydrate units being chemically bound to said glucosamine units and any non-deacylated glucosamide units, the partial deacylation of the biomass being from 35 to 80% deacylation.

17. A papermaking stock according to claim 16, further including filler.

18. A papermaking stock according to claim 16, wherein amino groups of at least one polymer of said biomass are cross-linked with epichlorohydrin.

19. A method of enhancing retention of components of a papermaking stock in a paper sheet formed from said stock in papermaking, comprising: adding to said stock comprising an aqueous dispersion of papermaking fibers, a papermaking additive in an aqueous vehicle, wherein said additive is a retention and strengthening papermaking additive comprising a partially deacylated microbial biomass of a polymer or oligomer having carbohydrate units chemically bound to glucosamide units, and the dissolved mycelium of the microbial biomass, said partially deacylated biomass containing 6 to 25%, by weight, of the biomass, of non-deacylated glucosamide units and glucosamine units derived from deacylation of glucosamide units of said polymer or oligomer, and 94 to 75% by weight of the biomass, of said carbohydrate units and said carbohydrate units being chemically bound to said glucosamine units and any non-deacylated glucosamide units, the partial deacylation of the biomass being from 35 to 80% deacylation; and forming a paper sheet from said stock.

20. A method according to claim 19, wherein said additive is present in an amount of 0.05 to 5%, by weight, based on the oven dry weight of said fibers.

21. A method according to claim 20, wherein said amount is between 0.1% and 2%, by weight.

22. A method according to claim 19, wherein amino groups of at least one polymer of said biomass are cross-linked with epichlorohydrin.

23. A method of producing paper comprising:
forming a sheet from a papermaking stock comprising an aqueous paper-forming dispersion of papermaking components comprising papermaking fibers and a papermaking additive in an aqueous vehicle, wherein said additive is a retention and strengthening papermaking additive comprising a partially deacylated microbial biomass of a polymer or oligomer having carbohydrate units chemically bound to glucosamide units, and the dissolved mycelium of the microbial biomass, said partially deacylated biomass containing 6 to 25%, by weight, of the biomass, of non-deacylated glucosamide units and glucosamine units derived from deacylation of glucosamide units of said polymer or oligomer, and 94 to 75% by weight of the biomass, of said carbohydrate units and said carbohydrate units being chemically bound to said glucosamine units and any non-deacylated glucosamide units, the partial deacylation of the biomass being from 35 to 80% deacylation.

24. A method according to claim 23, wherein amino groups of at least one polymer of said biomass are cross-linked with epichlorohydrin.

* * * * *